United States Patent [19]

Watanabe

[11] 3,782,733

[45] Jan. 1, 1974

[54] MINIATURE PHONOGRAPH HAVING RESTARTER MECHANISM

[76] Inventor: Katsumi Watanabe, No. 371, Ozenzi, Kawaski, Japan

[22] Filed: Oct. 26, 1971

[21] Appl. No.: 192,436

[52] U.S. Cl. .................................. 274/9 B, 274/10 E

[51] Int. Cl. ........................ G11b 25/04, G11b 17/08

[58] Field of Search .................. 274/9 B, 10 R, 10 E

[56] References Cited

UNITED STATES PATENTS

| | | | |
|---|---|---|---|
| 3,648,385 | 3/1972 | Barlow et al. | 274/9 B |
| 3,666,274 | 5/1972 | Fox et al. | 274/9 B |
| 3,540,132 | 11/1970 | Glass et al. | 274/9 B |

*Primary Examiner*—Louis R. Prince
*Assistant Examiner*—Steven L. Stephan
*Attorney*—Steinberg & Blake

[57] ABSTRACT

A miniature phonograph having a restarter device, comprising a receiving plate adapted to receive thereon a plurality of reserve discs contained in a vertically stacked-up manner in a top- and bottom-opened cylinder, a turntable carrying a disc thereon, and a disc outlet port, said receiving plate, turntable and outlet port being at the same horizontal elevation and arranged contiguous to each other in succession, means for transferring said reserve discs on said receiving plate onto said turntable successively from the lowermost one and setting the transferred disc on said turntable, means for controlling operation of said turntable, and means for releasing the set condition of the disc on the turntable and discharging that disc to the outside of the phonograph from said outlet port.

2 Claims, 8 Drawing Figures

INVENTOR

KATSUMI WATANABE

BY Stevens, Davis, Miller & Mosher [signature: Stanley & Blake]

ATTORNEYS

INVENTOR
KATSUMI WATANABE
BY Steinberg & Blake
ATTORNEYS

INVENTOR
KATSUMI WATANABE
BY Steinberg & Blake
ATTORNEYS

INVENTOR

KATSUMI WATANABE

BY Steinberg & Blake

ATTORNEYS

MINIATURE PHONOGRAPH HAVING RESTARTER MECHANISM

SUMMARY OF THE INVENTION:

The present invention relates mainly to the improvements in the miniature phonographs, and the primary object of the invention is to provide a phonograph whereby it is possible to automatically and continuously play numbers of musical pieces or sounds recorded on a plurality of discs, or to optionally select and play any desired one of the discs.

DETAILED DESCRIPTION OF THE INVENTION

Figure 1:
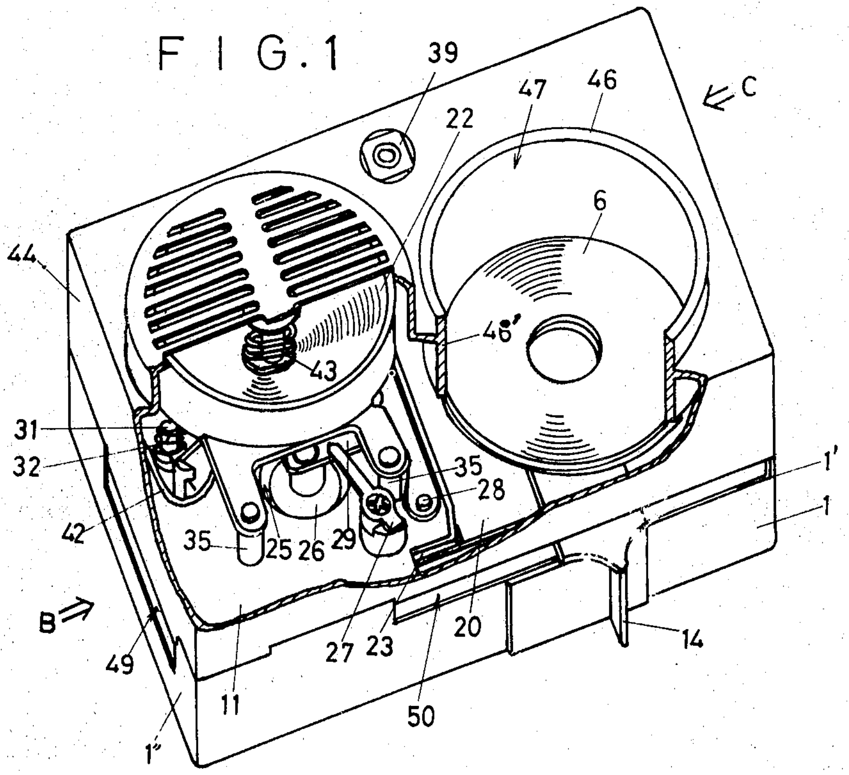
FIG. 1 is a perspective view of the miniature phonograph according to the present invention, with parts of the casing being broken away.
Figure 2:
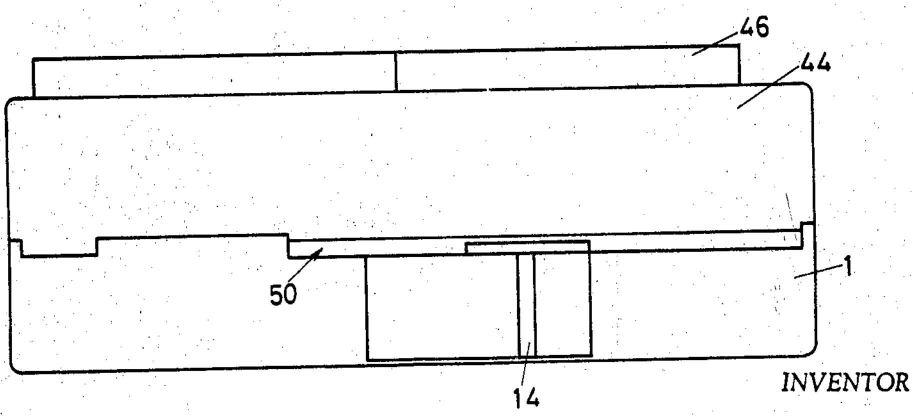
FIG. 2 is a front view thereof.
Figure 3:
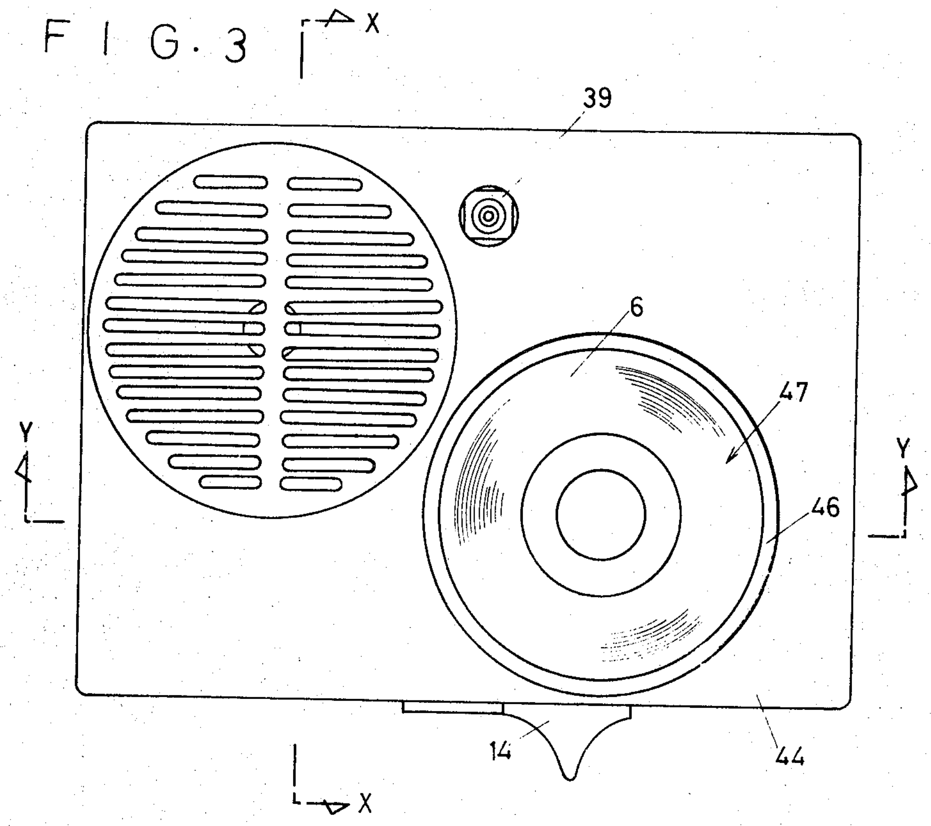
FIG.3 is a plan view thereof.

The conventional miniature or small-sized phonographs including the toy phonographs have involved very troublesome operation and means for playing a plural number of records as it was usually required to remove the casing cover and change the discs upon completion of the playing of one disc and then start playing of the next disc to hear the music or sounds recorded on that disc.

Although there are presently on the market some types of miniature phonographs which don't require such troublesome operation and in which exchange of the discs is carried out by slidingly inserting the new disc from a disc inlet port, the phonographs of such system are accompanied with a vital defect in that the surfaces of the discs could be badly damaged whenever they are exchanged since the stylus is always pressed against the disc surface during the exchanging operation.

The miniature phonograph according to the present invention has swept away such and other defects inherent to the conventional phonographs. According to the phonograph of the present invention, it is possible not only to automatically exchange a plurality of discs reserved in a stacked-up manner so as to play many pieces of music or sounds in succession simply by operating a lever, but also to repeat playing of a disc to enjoy the music or sounds on that disc in repetition. It is also possible to optionally select any desired disc from a multiplicity of discs in reserve to hear the tune or sounds recorded on that selected disc.

Now, the invention will be described in detail by way of its preferred embodiments with reference to the accompanying drawings.

For the sake of convenience of discussion and for better understanding, the invention will be described by dividing the entire assembly thereof into three sections A, B and C. Section A comprises the casing portion including a turntable 3 on which a disc 6 is placed, a bar 9 operable to drive a motor 39 and a disc outlet port 49 from which a disc is discharged out. Section B comprises the panel assembly provided with a pick-up mechanism 21, a speaker 22, a receiving plate 20 for receiving thereon, a plurality of discs 6, and an operating lever 14 operable to transfer said reserve discs 6 one by one onto said turntable 3. Section C comprises the cover portion provided with a spring 43 acting to press the speaker 22 toward the pick-up 21 and a disc container cylinder 46 having an inlet opening 47 from which the discs 6 may be fed into said cylinder one by one.

Now, the above-said three sections and their associated mechanisms will be described in detail one after another.

A turntable 3 arranged rotatable about a supporting shaft 2 is mounted in the casing 1, and a belt 4 is passed round said turntable. On said turntable 3 is attached a suitable sheet 5 such as for example a cloth whereby to protect the disc 6 carried thereon from being damaged on its surface. Said sheet is rotatable with the turntable 3.

A bevel 10 is formed at an end of a bar 9 which is actuated to move about a shaft 7 by the elastic force of a spring 8, and on said bevel 10 is placed an end of a slide element 12 which is projected downwardly of a panel 11. The other end 13 of said bar 9 is pressed against an inwardly and downwardly extending flange 15 of an operating lever 14 slidable along a slot 50 which is formed in the front wall 1' of the casing 1. Said operating lever has formed at its side faced inwardly of the casing 1 a cut-out portion or recession 14' having an arcuate configuration just conforming to a part of the circular periphery of the disc 6. There are also provided a pair of cantilever-type electric contact pieces 16, 16' extending parallel to each other within the range of swinging movement of the bar 9, said electric contact pieces being arranged to be contacted with or separated from each other by opeation of the operating lever 14 so as to open or close the electric circuit. At a corner of the casing 1 is mounted a battery 17 of which the (+) and (−) terminals 18 and 18' are connected through wires 42 to said electric circuit. Numeral 19 indicates the tap holes into which the fastening screws are driven when assembling together the panel portion B and the cover portion C.

The panel section B comprises a receiving plate 20 adapted to carry thereon a plurality of reserve discs 6 which were placed in a stacked-up manner into a container cylinder 46 from its top inlet opening 47 and a panel 11 mounted with a pick-up rod 21, a speaker 22 and other related elements. It is to be noted that the panel 11 is disposed at a higher level than the receiving plate 20 in a stepped manner, so that when the operating lever 14 is operated to cause sliding motion of its recessed portion 14' lying on the plate 20, the lowermost one of the stacked discs 6 on the receiving plate 20 is contacted with said arcuate recessed portion 14' of the operating lever 14 and is thereby pushed forward to pass through a space 23 at said stepped portion and transferred onto the turntable 3 positioned beneath the panel 11. On said receiving plate 20 are provided the protruding leaf springs 24 which serve to keep the discs 6 on said plate 20 from slipping or otherwise undesirably moving should the casing 1 be inclined in whatever manner.

Figure 5:
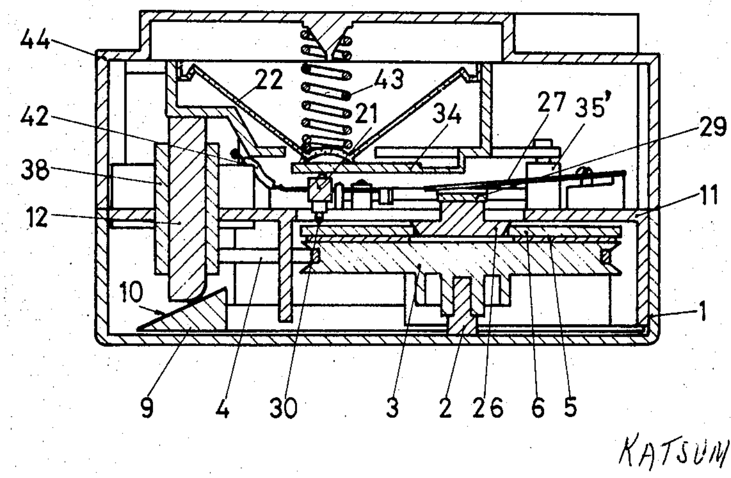
FIG. 5 is a longitudinal sectional side view taken on the line X—X of FIG. 3.

In the panel surface positioned above the turntable 3 is formed a circular hole 25 communicated with an arcuate slot 25' to be described later, and a downwardly tapered engaging element 26 is extended up through said circular hole so that its bottom end is positioned in the central hole 6' of a disc, whereby to accomplish the positioning and fixation of the disc 6 which has been transferred onto the turntable by the operating lever 14. Said engaging element 26 is always pressed downwardly by a spring 27 and secured to an end of a push bar 29 which is elastically movable about the shafts 28, 28'. Thus, as is illustrated most clearly in FIG. 5, the downwardly tapering periphery of element 26 is such that when a disc 6 is pushed, the pushing force will act on the tapered periphery of element 26 to raise the latter in opposition to the force of the spring 27 thus enabling a disc 6 to slip past the element 26. The next disc 6 which is to be placed on the turntable 3 slides beneath the element 26 which then snaps into the central opening of the next disc. Of course, each new disc pushes an already played disc out of the casing through the outlet 49. The arcuate slot 25' communicated with said circular hole 25 extends within the range where it gives no impediment to the movement of the stylus 30 at the end of the pickup rod 21 on the panel 11 as said stylus 30 is elastically swung about a shaft 31 by a spring 32 and moves along the sound groove 33 formed in the disc surface below the panel 11. Said spring 32 has an additional function to always elastically push the pickup bar 21 toward the speaker 22.

A vibratory plate 34, which is always pressed against the speaker 22, is swingably secured to the panel 11 through supporting legs 35, 35'. There is also provided a movable electric contact piece 36 which elastically operates to automatically open the electric circuit when the stylus 30 moves into the central hole 6' of the disc 6. Said contact piece 36 is positioned within the range of swinging movement of the free end of the pickup bar 21 and is arranged such that its end may be contacted with a fixed electric contact piece 37. Provided extending through the panel 11 is a slider frame 38 in which is slideably mounted a slider element 12 which has its one end located on the bevel 10 at the end of the bar 9, with the other end of said slider element being contacted against the backside of the speaker 22 so that the distance between the stylus 30 and the disc surface can be changed by operating said bar 9.

Also in the drawings, 39 designates a motor of which the shaft 40 projects downwardly through the panel 11 and has the belt 4 passed round its end, 41 a stopper for determining the starting position of the pickup bar 21, and 42 the wires adapted to form an electric circuit.

The cover casing 44 is provided with a spring 43 adapted to always press down the speaker 22 so as to give a suitable stylus pressure loaded to the sound groove 33 in the disc surface through the vibratory plate 34 and pickup bar 21. This cover 44 is fitted on the body casing 1 and integrally fastened together by means of screws 45. In said cover portion 44 is also provided an upright disc container cylinder 46 having a diameter slightly larger than that of each disc 6 and formed with a top opening 47 from which the discs are loaded into said cylinder. The bottom edge 46' of said cylinder 46 is positioned just above the receiving plate 20 of the panel section B so as to form therebetween a space 48 slightly wider than the thickness of a disc 6.

In FIG. 1, numeral 49 indicates a disc outlet port formed in the side wall 1'' on the turntable side of the casing 1. It will be noted that said turntable 3 and said receiving plate 20 are arranged on a same horizontal line. 50 is a lateral slot formed in the front wall of the casing 1 for allowing sliding motion of the operating lever 14. Said slot has a minimum length required for transferring one of the reserve discs 6 to the turntable 3.

Figure 4:
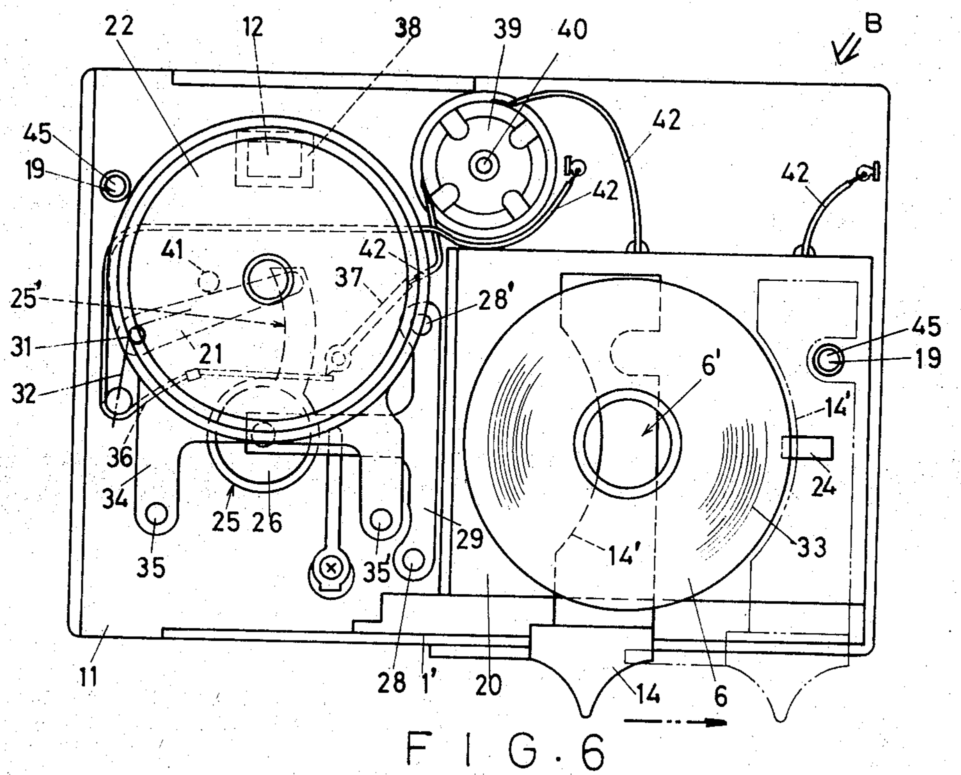
FIG. 4 is a plan view of the phonograph, with the casing being entirely removed to show the interior mechanism.
Figure 6:
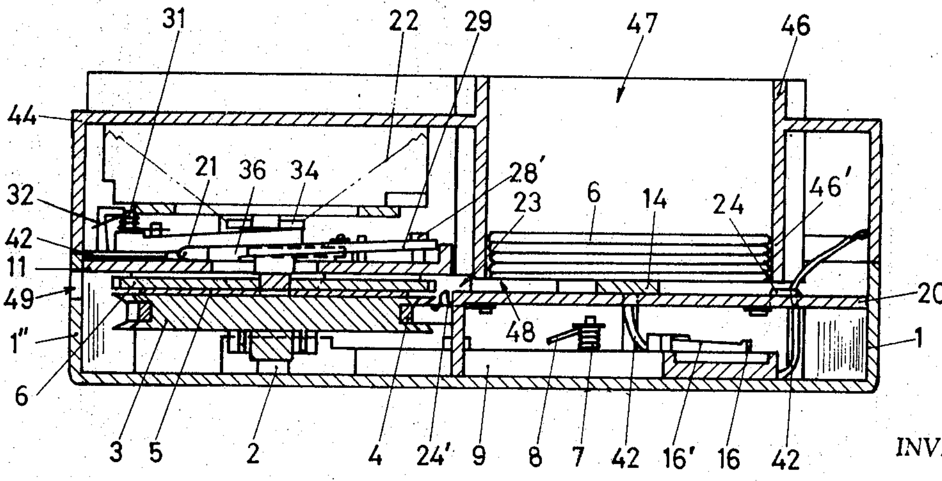
FIG. 6 is a longitudinal sectional front view taken on the line Y—Y of FIG. 3.

In use of the miniature phonograph of the present invention having the just described arrangement, first a required number of discs 6 are loaded into the container cylinder 46 from its top inlet opening 47 so that the discs are laid one upon another, then the operating lever 14 is once moved (in the direction shown by arrow in FIG. 4) to the right end of the casing 1 to let the discs already riding on said lever 14 drop onto the receiving plate 20, and then the operating lever 14 is moved to the left along the lateral slot 50 whereby the lowermost disc of the stack is pushed out by the edge of the arcuate recession 14' of said lever such that the pushed-out disc passes through the spaces 23 and transfers onto the turntable 3 below the panel 11. The disc 6 thus transferred has its central hole 6' passed through by the downwardly tapered engaging element 26 which acts elastically from the circular hole 25, whereby the disc is retained at the normal position on the turntable and, aided by the frictional action of the sheet 5 having a large coefficient of friction, the disc is fixed in a condition where it can rotate correctly with the turntable 3. In the above operation, when the operating lever 14 is first moved to the rightmost end of the casing, the inner flange 15 of the lever 14 presses the bar 9 to let it turn about the shaft 7 in the direction shown by arrow 51 in FIG. 7 against the elastic force of the return spring 8. Consequently, the electric contact pieces 16 and 16' are both pushed by the bar 9 and contacted with each other to form an electric circuit to start operation of the motor 39. Accordingly, the slider element 12 interposed between the bevel 10 at the end of the bar 9 and the backside of the speaker 22 is caused to fall down with movement of said bevel 10 under the elastic force of the spring 43 working between the cover 44 and the speaker 22, thus bringing the stylus 30 at the free end of the pickup bar 21 into engagement in the sound groove 33 on the disc surface through the vibratory plate 34. However, no disc is present on the turntable 3 during the initial phase of this operation, so that when the operating lever 14 is operated in the opposite direction, the pressing force of the flange 15 against the bar 9 is removed to allow said bar 9 to return to its original position under the elastic force of the spring 8, with the result that the bevel 10 acts like a wedge to raise up the slider element 12 and at the same time pushes up the speaker 22 through the slider element 12 against the elastic force of the spring 43, causing the stylus 30 to separate from the sound groove 33 by the action of the spring 32 so that the pickup bar 21 is set at the starting stopper 41. Therefore, the surface of the disc, which has passed the space 23 during this period, is kept away from the stylus 30 and hence remains safe from any damage.

Figures 7, 8:
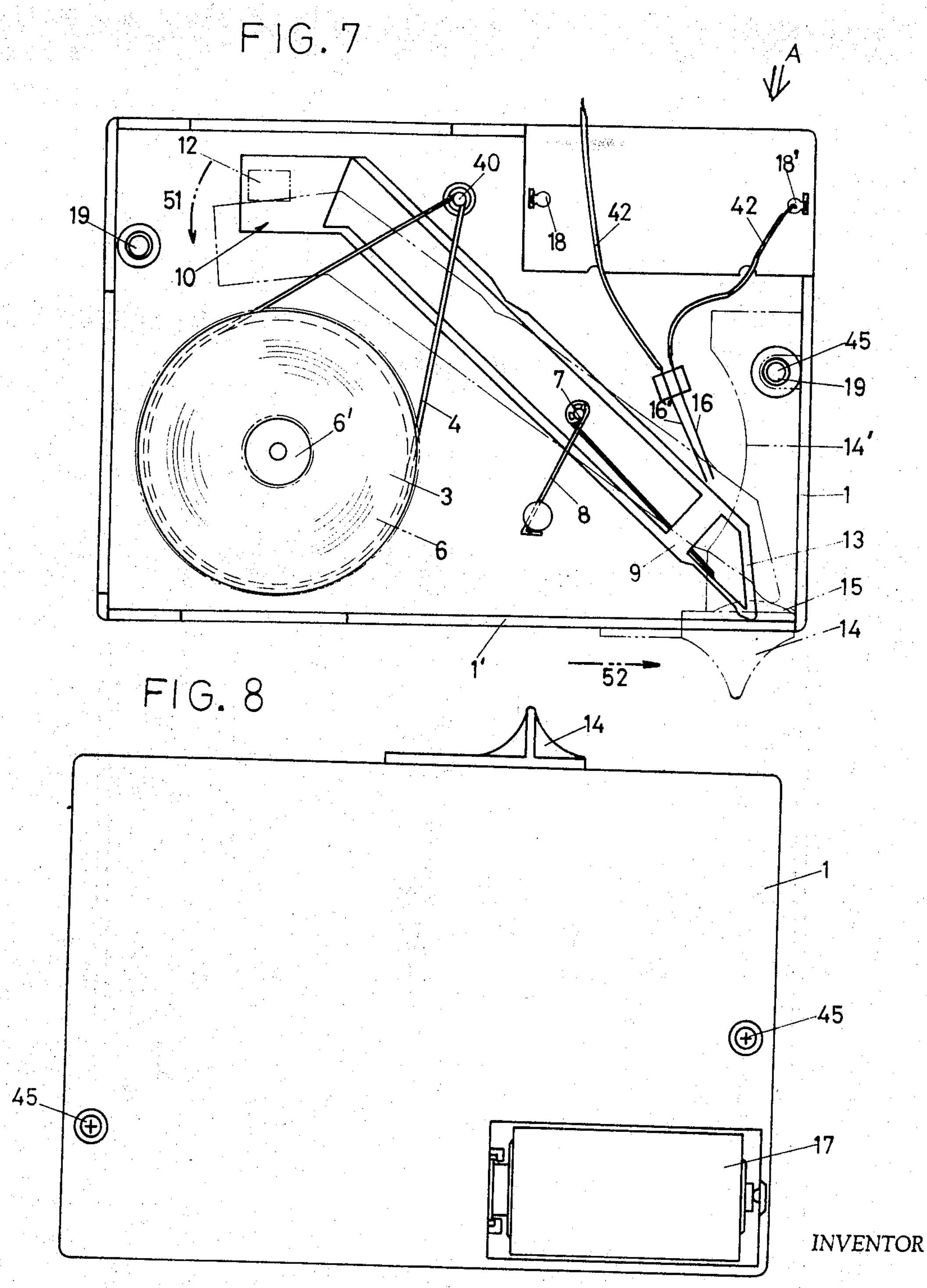
FIG. 7 is a plan view of the casing structure alone.
FIG. 8 is bottom view of the device.

Thereafter, when the operating lever 14 is again moved in the direction shown by arrow 52 in FIG. 7, the bar 9 is turned in the direction of arrow 51 in the same figure, bringing the movable contact piece 16' into contact with the fixed contact piece 16 to drive the motor 39, whereupon the slider element 12 moves down to press the stylus 30 down with a suitable pressing force into contact with the surface of the rotating disc thereunder, thus starting playing of the musical piece recorded in that disc. Upon completion of the tune, the pickup bar 21 pushes the elastic movable contact piece 36 to let it separate from the fixed contact piece 37 to thereby break the electric circuit.

For playing another piece of music or sounds, the operator moves the operating lever 14 once to the right to the limit of its rightward stroke and then again moves said lever to the left, whereby the lowermost one of the stacked up discs 6 in reserve is pushed out toward the turntable by the edge of the arcuate recession 14' of said lever 14 while the disc on the turntable is forced out of the casing 1 through the outlet port 49. Then, the operator again moves the operating lever 14 to the rightmost and, whereupon the desired new piece of music is played.

When it is desired to hear the same tune once again, one moves slightly leftward the operating lever 14 at the right end upon completion of the first performance so as to once return the bar 9 to its original position and to set the pickup bar 21 at the position of the starting stopper 41, and then again moves said lever 14 to let it return to its right end position.

Thus, according to the miniature phonograph of the present invention, it is possible not only to automatically and continuously play a plurality of records to hear many pieces of music or sounds in succession, but also to select any desired tune or sound or hear the same tune or sound in repetition. Further, the present phonograph is very simple in operation and works at high reliability.

Although the present invention has been described as it was adapted to miniature phonograph, it will be understood that the invention can also be immediately applied to the ordinary or large-sized phonographs to obtain the same effect and action as described above.

I claim:

1. In a miniature phonograph, a hollow cylinder for receiving a stack of discs which are to be played one after the other, a plate beneath the cylinder and a rotary turntable at the same elevation as said plate situated beside the latter, means for transferring the lowermost disc from said plate onto said turntable, a casing in which said turntable is housed, said casing having a side wall formed with an outlet port at the same elevation as said turntable so that shifting of a disc from said plate to said turntable will simultaneously shift a disc from said turntable out through said outlet port, a disc-engaging element having a downwardly tapered peripheral edge situated in a central opening of a disc on said turntable, so that said disc-engaging element with said downwardly tapered peripheral edge thereof maintains a disc properly positioned on the turntable, and a spring urging said disc-engaging element toward the turntable, so that in response to a force displacing a disc from the turntable to said outlet port, the disc will push the disc-engaging element against the force of the spring upwardly out of the opening permitting a disc previously on the turntable to slide beneath the disc-engaging element to the outlet port in response to movement by said transfer means of the next disc from said plate onto the turntable with the disc-engaging element then being advanced by the spring into the opening of the next disc when the latter has reached a playing position on the turntable.

2. The combination of claim 1 and wherein a stylus engages a groove of the disc on the turntable during operation of the phonograph, a pickup arm carrying the stylus, a spring connected to the pickup arm for urging the latter to a starting position while raising the stylus away from the disc, a speaker engaging the pickup arm, a spring urging the speaker toward the pickup arm to remain in engagement therewith, an elongated swingable bar having an end adjacent said disc-transfer means, the latter having a flange for engaging said bar to swing the latter in response to movement of said disc-transfer means, said bar having a portion provided with an inclined surface, and a motion-transfer element extending between said inclined surface and said speaker for raising said speaker away from a disc in opposition to the spring which urges said speaker toward said pickup arm when said bar is swung by said flange of said transfer means during displacement of one record from the turntable and another record onto the turntable, so that when the speaker is thus raised the pickup arm will be returned by the spring acting thereon to the starting position while raising the stylus away from a disc, and a switch for starting and stopping the phonograph controlled by said bar to assume a closed position only when said bar is in a position determined by location of said transfer means at a position where a new record has reached its operating position on the turntable.

* * * * *